R. S. BASSETT.
WATER METER.
APPLICATION FILED OCT. 22, 1919.

1,390,664.

Patented Sept. 13, 1921.

WITNESSES:
Chas. F. Bassett
W. J. Chellew

INVENTOR
Robt S. Bassett

# UNITED STATES PATENT OFFICE.

ROBERT S. BASSETT, OF BUFFALO, NEW YORK.

WATER-METER.

1,390,664.  Specification of Letters Patent.  Patented Sept. 13, 1921.

Application filed October 22, 1919. Serial No. 332,403.

*To all whom it may concern:*

Be it known that I, ROBERT S. BASSETT, a citizen of the United States, residing at Buffalo, in the county of Erie and State of New York, have invented new and useful Improvements in Water-Meters, of which the following is a specification.

This invention relates to water meters of the frost-proof type and has for its object the supporting of the inner and more expensive working parts of the meter in the outer surrounding case in such a manner that as the meter freezes they, as well as the main outer case, will be relieved from strain and distortion due to the breaking of an inexpensive part, usually the bottom of the outer case.

The objects of my present invention are principally to improve the construction and arrangement of parts in these meters for the purpose of reducing the cost of manufacture, increasing the durability and efficiency and giving other advantageous results.

I will now proceed to definitely describe the manner in which I have carried out my invention and then claim what I believe to be novel.

Figure 1:
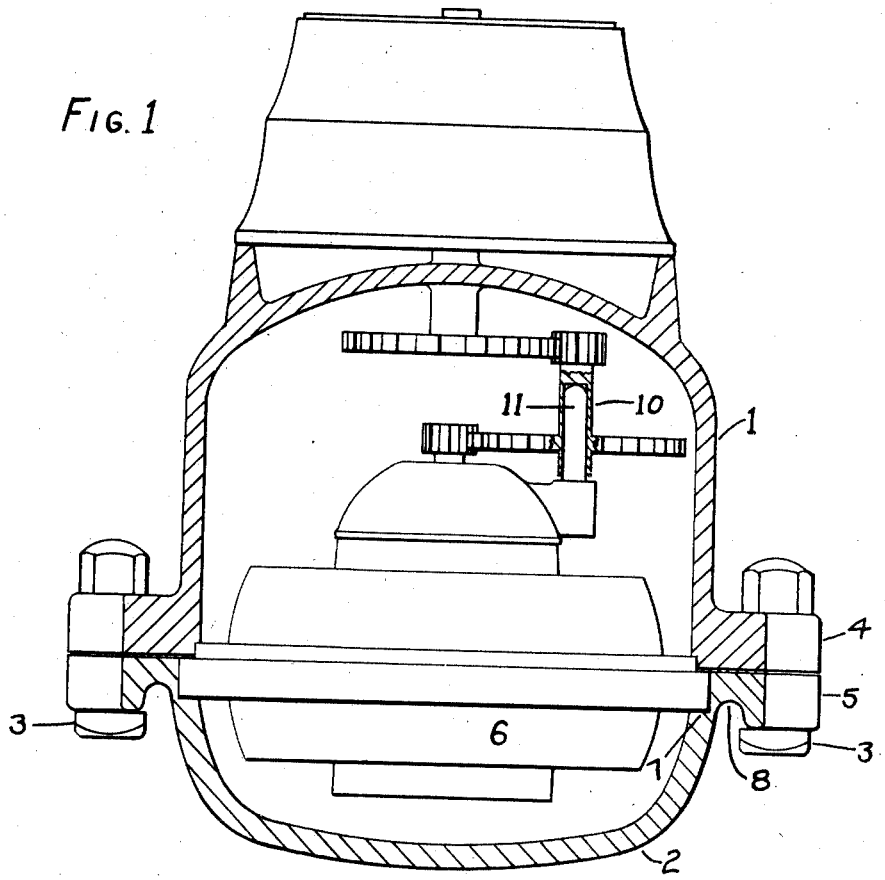
Figure 2:
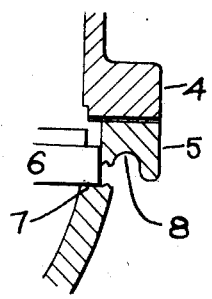

In the accompanying drawings Figure 1 is a central vertical section of my improved meter; Fig. 2 is a vertical section of a breakable part of the meter casing, showing how the part breaks by tension and not by shear when the meter freezes.

Referring to the drawings 1 is the main outer casing of the meter, 2 is the breakable bottom casing of the meter which is attached to casing 1 by bolts 3, 3 passing through meeting flanges 4 and 5 and clamping them together. 6 is the measuring chamber clamped and centered between casings 1 and 2 in the machined grooved seat 7 formed in the upper machined surface of flange 5 of breakable casing 2. On the under side of flange 5 is formed the cast groove 8 which extends upwards to and a little above the bottom plane of grooved seat 7, so that when the meter freezes the metal, which is of a predetermined thickness, between grooved seat 7 and recess 8 will fracture by the tension strain becoming too great for it to withstand and the measuring chamber 6 will be released as shown in Fig. 2. 10 is the internal immersed tooth gearing loosely mounted on rigid post 11 on top of measuring chamber 6 so that it may be raised axially from said measurng chamber when outer casing is lifted, relative to measuring chamber 6.

Having thus described my invention what I claim and wish to secure by Letters Patent is:

1. A water meter casing comprising a casing member provided with a securing flange having at the base thereof an internal groove and an external groove which coact to form an annular reduced portion readily breakable parallel to the contact surface of the flange and meter measuring mechanism directly supported by that part of the member surrounded by said portion; substantially as and for the purpose described.

2. A water meter casing comprising a casing member provided with a securing flange having at the base thereof an internal groove and an external groove which coact to form an annular reduced portion readily breakable in a plane perpendicular to the direction of the resultant force tending to rupture said portion and meter measuring mechanism directly supported by that part of the member surrounded by said portion; substantially as and for the purpose described.

3. A water meter casing comprising a casing member provided with a securing flange having at the base thereof an internal groove and an external groove which coact to form an annular reduced portion readily breakable under a tensile stress and meter measuring mechanism directly supported by that part of the member surrounded by said portion; substantially as and for the purpose described.

4. A water meter casing comprising a casing member provided with a securing flange having at the base thereof an internal groove and an external groove which coact to form an annular reduced portion of exact predetermined area in cross section readily breakable under an exact predetermined tensile stress parallel to the contact surface of the flange and meter mechanism directly supported by that part of the member surrounded by said portion; substantially as and for the purpose described.

5. A water meter comprising an inner measuring mechanism, an outer casing having a readily breakable section allowing the meter measuring mechanism to be displaced when broken, immersed toothed gearing loosely mounted on said measuring mechanism and capable of axial movement independent of both said meter casing and said measuring mechanism when said measuring mechanism is displaced from its normal position by said meter freezing, and positive means for holding said immersed toothed gearing positively in place when said meter measuring mechanism is in its normal position but releasing said gearing when said meter measuring mechanism is displaced from its normal position; substantially as and for the purpose described.

6. A water meter comprising an outer casing provided with a part flange formed at the margin thereof, there being a grooved seat formed in the inner margin of the face of said flange so as to coact with the outer surface of said outer casing to form a readily breakable portion, and a meter measuring mechanism positively supported in said grooved seat but automatically released when said portion breaks; substantially as and for the purpose described.

7. A water meter comprising an outer casing provided with a part flange formed at the margin thereof, there being a grooved seat formed in the inner margin of the face of said flange so as to coact with an external grooved recess formed on the outer side of said flange to form a readily breakable portion, and meter measuring mechanism positively supported in said groove seat but automatically released when said portion breaks; substantially as and for the purpose described.

8. A water meter comprising an outer casing provided with a part flange formed at the margin thereof, there being a grooved seat formed in the inner margin of the face of said flange so as to coact with an external grooved recess formed on the outer side of said flange to form a readily breakable portion, a meter measuring mechanism and a supporting flange formed on said measuring mechanism of less thickness than said part flange whereby said measuring mechanism is normally supported in said grooved seat but is automatically released when said portion breaks; substantially as and for the purpose described.

ROBERT S. BASSETT.